US000001474H

United States Statutory Invention Registration [19]

[11] Reg. Number: H1474

Martin et al.

[43] Published: Aug. 1, 1995

[54] TITANYL PHTHALOCYANINE IMAGING MEMBER AND PROCESSES

[76] Inventors: Trevor I. Martin, 502 Shannon Crescent, Burlington, Ontario, Canada, L7L 2R8; Sharon E. Normandin, 4650 County Line Rd., Macedon, N.Y. 14502; Kathleen M. Carmichael, 5689 Pease Rd., Williamson, N.Y. 14589; Donald P. Sullivan, 20 Chadwick Dr., Rochester, N.Y. 14618

[21] Appl. No.: 107,108

[22] Filed: Aug. 13, 1993

[51] Int. Cl.[6] ..... H01M 2/36

[52] U.S. Cl. ..... 430/78

[58] Field of Search ..... 430/78

[56] References Cited

U.S. PATENT DOCUMENTS

| | | | |
|---|---|---|---|
| 3,992,205 | 11/1976 | Wiedemann | 96/1.6 |
| 4,728,592 | 3/1988 | Ohaku et al. | 430/59 |
| 4,882,254 | 11/1989 | Loutfy et al. | 430/59 |
| 4,985,322 | 1/1991 | Azami et al. | 430/44 |
| 5,153,313 | 10/1992 | Kazmaier et al. | 540/138 |
| 5,189,156 | 2/1993 | Mayo et al. | 540/141 |
| 5,206,359 | 4/1993 | Mayo et al. | 540/141 |

FOREIGN PATENT DOCUMENTS

| | | | |
|---|---|---|---|
| 55-142357 | 11/1988 | Japan | 430/78 |
| 5-11472 | 1/1993 | Japan | 430/78 |

*Primary Examiner*—Donald P. Walsh
*Assistant Examiner*—Anthony R. Chi

[57] ABSTRACT

A process for increasing the imaging cyclic stability of titanyl phthalocyanines by adding to said titanyl phthalocyanines a perylene.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TITANYL PHTHALOCYANINE IMAGING MEMBER AND PROCESSES

BACKGROUND OF THE INVENTION

This invention is generally directed to titanyl phthalocyanines and processes for the preparation thereof, and more specifically the present invention is directed to mixtures of titanyl phthalocyanines, especially Type IV, and perylenes, such as those illustrated in U.S. Pat. No. 4,882,254, the disclosure of which is totally incorporated herein by reference. In embodiments, the present invention is directed to processes of improving the cyclic stability of infrared absorbing photogenerating pigments like titanyl phthalocyanine (TiOPc), especially the Type IV titanyl phthalocyanine. Also, the addition of titanyl phthalocyanines, such as Type IV, to perylenes like benzimidazole perylenes increases the photosensitivity of the perylenes especially at 670 nanometers, and further enables the provision of a photoconductor, or imaging member with excellent photosensitivity at wavelengths of from between about 700 to about 840 nanometers wherein the photosensitivity of benzimidazole perylenes (BZP) is known to decrease.

Imaging members with a number of photogenerating pigments, including BZP, titanyl phthalocyanines, metal free phthalocyanines, vanadyl phthalocyanines, and the like, are known. There are illustrated in U.S. Pat. No. 4,882,254, layered imaging members with perylenes, such as benzimidazoles and mixtures thereof, with phthalocyanines, such as vanadyl phthalocyanines, see column 3 of this patent for example. Also known are layered imaging members with certain photogenerating pigments like selenium and charge transport aryl diamines, reference U.S. Pat. No. 4,265,990, the disclosure of which is totally incorporated herein by reference. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductive imaging members can be selected for a number of different known imaging and printing processes including, for example, electrophotographic imaging processes, especially xerographic imaging and printing processes wherein negatively charged or positively charged images are rendered visible with toner compositions of the appropriate charge. Generally, the imaging members containing phthalocyanines are sensitive in the wavelength regions of from about 700 to about 850 nanometers, thus diode lasers can be selected as the light source.

In U.S. Pat. No. 4,728,592, there is illustrated, for example, the use of alpha type TiOPc (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta Type TiOPc (Type II) as a pigment, which is believed to provide a much poorer quality photoreceptor.

In Konica Japanese 64-17066/89, there is disclosed, for example, the use of a new crystal modification of TiOPc prepared from alpha type pigment (Type II) by milling it in a sand mill with salt and polyethylene glycol. This pigment had a strong XRPD peak at a value of 2 theta of 27.3 degrees. This publication also discloses that this new form differs from alpha type pigment (Type II) in its light absorption and shows a maximum absorbance at 817 nanometers compared to alpha type, which has a maximum at 830 nanometers. The XRPD shown in the publication for this new form is believed to be identical to that of the Type IV form previously described by Sanyo-Shikiso in JOP 63-20365. The aforementioned Konica publication also discloses the use of this new form of TiOPc in a layered electrophotographic device having high sensitivity to near infrared light of 780 nanometers. The new form is indicated to be superior in this application to alpha type TiOPc (Type II). Further, this new form is also described in U.S. Pat. No. 4,898,799.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material, which is incapable of transporting for any significant distance injected charge carriers generated by the photoconductive particles.

The following copending patent applications illustrate processes for the preparation of titanyl phthalocyanines, including Type IV in some instances and layered imaging members thereof.

In a copending application U.S. Ser. No. 537,714, the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example U.S. Pat. No. 4,429,029 mentioned hereinbefore.

In U.S. Pat. No. 5,153,313 (D/90244), the disclosure of which is totally incorporated herein by reference, there is illustrated a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In U.S. Pat. No. 5,206,359, there is disclosed a process for the preparation of titanyl phthalocyanine which comprises the treatment of titanyl phthalocyanine Type X with a halobenzene; U.S. Pat. No. 5,189,156 discloses a process for the preparation of titanyl phthalocyanine which comprises the reaction of a titanium tetraalkoxide and diiminoisoindolene in the presence of a halonaphthalene solvent; dissolving the resulting Type I titanyl phthalocyanine in a haloacetic acid and an alkylene halide; adding the resulting mixture slowly to a cold alcohol solution; and thereafter isolating the resulting Type X titanyl phthalocyanine with an average volume particle size diameter of from about 0.02 to about 0.5 micron; and thereafter redispersing the Type X titanyl phthalocyanine in chlorobenzene in order to convert it to the titanyl phthalocyanine Type IV polymorph which is isolated by filtration. U.S. Pat. No. 5,189,155 discloses a process for the preparation of titanyl phthalocyanine Type I which comprises the reaction of titanium tetraalkoxide and diiminoisoindolene in the presence of a halonaphthalene solvent. More specifically, in one embodiment of this copending application there are provided processes for the preparation of titanyl phthalocyanine (TiOPc) Type X polymorphs which comprises the solubilization of a titanyl phthalocyanine Type I, which can be obtained by the reaction of $DI^3$ and titanium tetrabutoxide in the presence of a solvent, such as chloronaphthalene, reference U.S. Pat. No. 5,189,156 the disclosure of which is totally incorporated herein by reference, in a mixture of trifluoroacetic acid and methylene chloride, precipitation of the desired titanyl phthalocyanine Type X, separation by, for example, filtration, and thereafter subjecting the product to washing with fluorobenzene. The product can be identified by various known means including X-ray powder diffraction (XRPD). The disclosures of each of the aforementioned patents are totally incorporated herein by reference.

SUMMARY OF THE INVENTION

It is an object of the present invention to provide imaging members with a mixture of titanyl phthalocyanines and perylenes as photogenerating pigments.

It is yet another object of the present invention to provide processes for improving the cyclic stability of photogenerating pigments like titanyl phthalocyanines, such as Type IV, by adding thereto a visible absorber like BZP wherein, for example, the titanyl phthalocyanine retains its photosensitivity at IR wavelengths, such as 780 nanometers.

Another object of the present invention relates to processes for improving the photosensitivity of perylenes like BZP to extend beyond 600 nanometers and to, more specifically, 670 nanometers.

Moreover, another object of the present invention relates to imaging members and processes for the preparation of photogenerating pigments thereof comprised of a mixture of BZP and titanyl phthalocyanines, such as Type IV, and wherein the members possess high photosensitivity between about 600 to about 840 nanometers.

In embodiments, the present invention relates to imaging members and process for the preparation of photogenerating pigments. More specifically, the present invention relates to processes for improving the cyclic stability of titanyl phthalocyanines by the addition thereto of perylenes, especially BZP, and wherein, for example, the cyclic stability of the BZP is not substantially reduced.

The process of the present invention in embodiments comprise the addition of BZP to titanyl phthalocyanine like Type IV titanyl phthalocyanine wherein, for example, from about 50 to about 75 weight percent of BZP and from about 50 to about 25 weight percent of titanyl phthalocyanine are selected. In this manner, the cyclic stability of the titanyl phthalocyanine is improved. TiOPc alone evidences as much as 22 percent decrease in $V_{ddp}$ over 10,000 imaging cycles from an initial $V_{ddp}$ ranging from about 800 to about 950 volts; and in contrast the TiOPc/BZP mixtures evidence as little as a 3 percent decrease in $V_{ddp}$ over 10,000 imaging cycles for a 25/75 mixture of TiOPc/BZP, and up to a 10 percent decrease in $V_{ddp}$ over 10,000 imaging cycles for a 75/25 mixture of TiOPc/BZP. Also, with the processes of the present invention in embodiments the photosensitivity of BZP is improved at, for example, 670 nanometers and the cyclic stability thereof remains relatively constant, for example BZP at 670 nanometers usually shows a $<50$ percent discharge on exposure to 3.8 ergs/cm$^2$; this increases to as much as 86 percent with the addition of TiOPc. BZP alone normally shows between 5 and 10 percent cycledown of $V_{ddp}$ over 10,000 imaging cycles.

In one embodiment, the process of the present invention comprises the addition of BZP, about 50 weight percent, to titanyl phthalocyanine Type IV, about 50 percent by weight, dispersed in a film forming polymer binder. Film forming binders which are suitable include, for example, polycarbonates polyesters, polystyrenes, polystyrene-co-vinyl pyridines and polyvinyl butyrals. The mixture of the charge generating particles, such as BZP and TiOPc Type IV, employed in the charge generating layer can be accomplished by milling the particles separately in a binder and solvent mixture. Suitable solvents include toluene, butyl acetate, and ethyl acetate. After milling the particles separately for times ranging from about 1 hour to about 120 hours, and preferably from 8 hours to 96 hours, the dispersions are then combined. Milling techniques include, for example, a ball mill, attritor, or the like.

Generally, for dried generating layers of this invention, between about 20 percent by weight to about 80 percent by weight of the mixed photogenerating pigment is dispersed in between about 80 percent and about 20 percent by weight of binder. More preferably, between about 30 percent and about 60 percent by weight of the mixed photogenerating pigment is dispersed in between about 70 percent and about 40 percent by weight of the binder. The ratio of BZP particles to TiOPc particles may range from 9:1 to about 1:9, and preferably is about 1:1. The specific proportions selected also depend on the photosensitivity and cyclic stability desired. Generating layer thicknesses of generally between 0.05 micron and 4 microns are preferred.

Numerous different layered photoresponsive imaging members with the phthalocyanine-perylene pigments obtained by the processes of the present invention can be fabricated. In one embodiment, the layered photoresponsive imaging members can be comprised of a supporting substrate, a charge transport layer, especially an aryl amine hole transport layer, and situated therebetween a photogenerator layer comprised of a mixture of BZP and titanyl phthalocyanine. Another embodiment of the present invention is directed to positively charged layered photoresponsive imaging members comprised of a supporting substrate, a charge transport layer, especially an aryl amine hole transport layer, and as a top overcoating comprised of a mixture of titanyl phthalocyanine Type IV and BZP obtained with the processes of the present invention. Moreover, there is provided in accordance with the present invention an improved negatively charged photoresponsive imaging member comprised of a supporting substrate, a thin adhesive layer, a composite photogenerating layer obtained by the processes of the present invention dispersed in a polymeric resinous binder, and as a top layer aryl amine hole transporting molecules dispersed in a polymeric resinous binder.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° C. to about 200° C. for from 10 minutes to several hours under stationary conditions or in an air flow. The coating is carried out in such a manner that the final coating thickness is from 0.01 to about 30 microns after it has dried. The fabrication conditions for a given layer can be tailored to achieve optimum performance and cost in the final device.

Imaging members with the titanyl phthalocyanine mixtures of the present invention are useful in various electrostatographic imaging and printing systems, particularly those conventionally known as xerographic processes. Specifically, the imaging members of the present invention are useful in xerographic imaging processes wherein the titanyl phthalocyanine mixtures absorb light of a wavelength of from about 650 nanometers to about 900 nanometers and wherein the imaging members retain their cyclic stability for 500,000 imaging cycles in a modified Xerox Corporation 1075 imaging apparatus. In these known processes, electrostatic latent images are initially formed on the imaging member followed by development, and thereafter transferring the image to a suitable substrate.

Moreover, the imaging members of the present invention can be selected for electronic printing processes with gallium arsenide based laser diode raster output scanning devices or light emitting diode (LED) arrays which typically function at wavelengths of from 660 to about 830 nanometers.

SPECIFIC EMBODIMENTS

For a better understanding of the present invention and further features thereof, reference is made to the following detailed description of various preferred embodiments wherein the imaging member is comprised of a supporting substrate, thereover a solution coated adhesive layer comprised, for example, of a polyester 49,000 available from Goodyear Chemical, a photogenerator layer comprised of a mixture of titanyl phthalocyanine Type IV and BZP, 50 weight percent of each, and which mixture is obtained with the processes as illustrated herein, optionally dispersed in an inactive resinous binder, and a charge transport top layer comprised of N,N'-diphenyl-N,N'-bis(3-methyl phenyl)-1,1'-biphenyl-4,4'-diamine dispersed in a polycarbonate resinous binder. This member has the following xerographic discharge and xerographic cycling characteristics, 75 percent discharge at 3.8 ergs/cm$^2$ of white light from a $V_{ddp}$ 980 Volts; 7.1 percent cycledown after 10,000 cycles.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ® a commercially available polymer, MYLAR ® coated with titanium, a layer of an organic or inorganic material having a semiconductive surface layer such as indium tin oxide or aluminum arranged thereon, or a conductive material inclusive of aluminum, chromium, nickel, brass or the like. The substrate may be flexible, seamless, or rigid and may have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON ®.

The thickness of the substrate layer depends on many factors, including economical considerations, thus this layer may be of substantial thickness, for example over 3,000 microns, or of minimum thickness providing there are no adverse effects on the system. In one embodiment, the thickness of this layer is from about 75 microns to about 300 microns.

With further regard to the imaging members, the photogenerator layer is comprised of the mixture of perylene and titanyl phthalocyanine pigments obtained with the processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns. In one embodiment, this layer is of a thickness of from about 0.25 micron to about 1 micron when the photogenerator composition present in this layer contains an amount of 30 to 75 percent by volume of photogenerator pigments. The maximum thickness of this layer in an embodiment is dependent primarily upon factors, such as photosensitivity, xerographic properties and mechanical considerations. The charge generator layer can be obtained by dispersion coating the TiOPc-BZP mixture obtained with the processes of the present invention, and a binder resin with a suitable solvent. The binder may be omitted. The dispersion can be prepared by mixing and/or milling the mixture in equipment such as paint shakers, ball mills, sand mills and attritors. Common grinding media such as glass beads, steel balls or ceramic beads may be used in this equipment. A binder resin may be selected from a wide number of polymers such as poly(vinyl butyral), poly(vinyl carbazole), polyesters, polycarbonates, poly(vinyl chloride), polyacrylates and methacrylates, copolymers of vinyl chloride and vinyl acetate, copolymers of styrene and 4-vinyl pyridine, phenoxy resins, polyurethanes, poly(vinyl alcohol), polyacrylonitrile, polystyrene, and the like. The solvents to dissolve these binders depend upon the particular resin. In embodiments of the present invention, it is desirable to select solvents that do not effect the other coated layers of the device. Examples of solvents useful for coating the mixed dispersions to form a photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate, methoxyethyl acetate, and the like.

The coating of the mixture dispersion in embodiments of the present invention can be accomplished with spray, dip or wire bar methods such that the final dry thickness of the charge generator layer is from 0.01 to 30 microns and preferably from 0.1 to 15 microns after being dried at 40° C. to 150° C. for 5 to 90 minutes.

Also, illustrative examples of polymeric binder resinous materials that can be selected for the photogenerator pigment include those polymers as disclosed in U.S. Pat. No. 3,121,006, the disclosure of which is totally incorporated herein by reference.

As adhesives, there can be selected various known substances inclusive of polyesters, polyamides, poly(vinyl butyral), poly(vinyl alcohol), polyurethane and polyacrylonitrile. This layer is of a thickness of from about 0.05 micron to about 1 micron. Optionally, this layer may contain conductive and nonconductive particles, such as zinc oxide, titanium dioxide, silicon nitride, carbon black, and the like to provide, for example, in embodiments of the present invention desirable xerographic and optical properties.

Aryl amines selected for the charge transporting layer which generally is of a thickness of from about 5 microns to about 75 microns, and preferably of a thickness of from about 10 microns to about 40 microns, include molecules of the following formula:

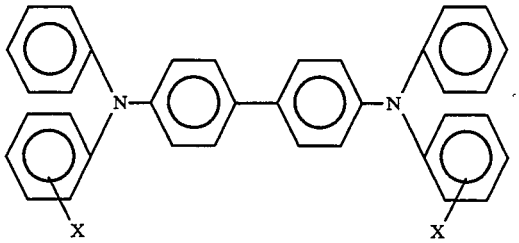

dispersed in a highly insulating and transparent organic resinous binder wherein X is an alkyl group or a halogen, especially those substituents selected from the group consisting of (ortho) $CH^3$, (para) $CH^3$, (ortho) CL, (meta) CL, and (para) CL.

Examples of specific aryl amines are N,N'-diphenyl-N,N'-bis(alkylphenyl)-1,1-biphenyl-4,4'-diamine wherein alkyl is selected from the group consisting of methyl, such as 2-methyl, 3-methyl and 4-methyl, ethyl, propyl, butyl, hexyl, and the like. Substitution enables the amine N,N'-diphenyl-N,N'-bis(halophenyl)-1, 1'-biphenyl-4,4'-diamine wherein halo is 2-chloro, 3-chloro or 4-chloro. Other known hole transporting compounds can be selected.

Examples of the highly insulating and transparent resinous material or inactive binder resinous material for the transport layers include materials such as those described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The invention will now be described in detail with reference to specific preferred embodiments thereof, it being understood that these Examples are intended to be illustrative only. The invention is not intended to be limited to the materials, conditions, or process parameters recited herein, it being noted that all parts and percentages are by weight unless otherwise indicated. Comparative data and Examples are also presented.

EXAMPLE I

A control photoconductive imaging member was prepared by providing a web of titanium coated polyester (MELINEX TM available from ICI Americas Inc.) substrate having a thickness of 3 mils, and applying thereto, with a gravure applicator, a solution containing 50 grams of 3-aminopropyltriethoxysilane, 15 grams of acetic acid, 684.8 grams of 200 proof denatured alcohol and 200 grams of heptane. This layer was then dried for about 5 minutes at 135° C. in the forced air dryer of the coater. The resulting blocking layer had a dry thickness of 500 Angstroms.

An adhesive interface layer was then prepared by applying a wet coating over the blocking layer, using a gravure applicator, containing 3.5 percent by weight, based on the total weight of the solution, of copolyester adhesive (DuPont 49,000 available from E. I. DuPont de Nemours & Company) in a 70:30 volume ratio mixture of tetrahydrofuran/cyclohexanone. The adhesive interface layer was then dried for about 5 minutes at 135° C. in the forced air dryer of the coater. The resulting adhesive interface layer had a dry thickness of 620 Angstroms.

The adhesive interface layer was, thereafter, coated with a photogenerating layer (CGL) containing 70 percent by volume of Type IV titanyl phthalocyanine, and 30 percent by volume of polyvinyl butyral. This photogenerating layer was prepared by introducing 0.18 gram of polyvinyl butyral (BMS) and 19 milliliters of n-butyl acetate into a 2 ounce amber bottle. To this solution was added 0.56 gram of Type IV titanyl phthalocyanine and 100 grams of ⅛ inch diameter stainless steel shot. This mixture was then placed on a ball mill for 24 hours. The resulting slurry was, thereafter, applied to the adhesive interface with a Bird applicator to form a layer having a wet thickness of 0.25 mil. The layer was dried at 135° C. for 5 minutes in a forced air oven to form a dry thickness photogenerating layer having a thickness of 0.4 micrometer.

This photogenerator layer was overcoated with a charge transport layer. The charge transport layer was prepared by introducing into an amber glass bottle in a weight ratio of 1:1 N,N'-diphenyl-N,N'-bis(3-methylphenyl)- 1,1'-biphenyl-4,4'-diamine and MAKROLON®, a polycarbonate resin having a molecular weight of from about 50,000 to 100,000 commercially available from Farbenfabriken Bayer A.G. The resulting mixture was dissolved in methylene chloride to form a solution containing 15 percent by weight of solids. This solution was applied on the photogenerator layer using a Bird applicator to form a coating which upon drying had a thickness of 25 microns. During this coating process, the relative humidity was equal to or less than 15 percent. The resulting photoreceptor device containing all of the above layers was annealed at 135° C. in a forced air oven for 5 minutes and, thereafter, cooled to ambient room temperature.

EXAMPLE II

A photoconductive imaging member of the present invention was prepared by providing a web of titanium coated polyester (MELINEX TM available from ICI Americas Inc.) substrate having a thickness of 3 mils, and applying thereto with a gravure applicator a solution containing 50 grams of 3-amino-propyltriethoxysilane, 15 grams of acetic acid, 684.8 grams of 200 proof denatured alcohol and 200 grams of heptane. This layer was then dried for about 5 minutes at 135° C. in the forced air dryer of the coater. The resulting blocking layer had a dry thickness of 500 Angstroms.

An adhesive interface layer was then prepared by applying a wet coating over the blocking layer, using a gravure applicator, containing 3.5 percent by weight, based on the total weight of the solution, of copolyester adhesive (DuPont 49,000 available from E. I. DuPont de Nemours & Company) in a 70:30 volume ratio mixture of tetrahydrofuran/cyclohexanone. The adhesive interface layer was then dried for about 5 minutes at 135° C. in the forced air dryer of the coater. The resulting adhesive interface layer had a dry thickness of 620 Angstroms.

The adhesive interface layer was, thereafter, coated with a photogenerating layer (CGL) containing 70 percent by volume of Type IV titanyl phthalocyanine, and 30 percent by volume of copolymer polystyrene (90 percent)/poly-4-vinyl pyridine (10 percent) with $M_w$ of 15,000. This photogenerating layer was prepared by introducing 0.18 gram of polystyrene/poly-4-vinyl pyridine and 19 milliliters of toluene into a 2 ounce amber bottle. To this solution was added 0.56 gram of Type IV titanyl phthalocyanine and 100 grams of ⅛ inch diameter stainless steel shot. This mixture was then placed on a ball mill for 24 hours. The resulting slurry was, thereafter, applied to the adhesive interface with a Bird applicator to form a layer having a wet thickness of 0.25 mil. The layer was dried at 135° C. for 5 minutes in a forced air oven to form a dry thickness photogenerating layer having a thickness of 0.4 micrometer.

This photogenerator layer was overcoated with a charge transport layer. The charge transport layer was prepared by introducing into an amber glass bottle in a weight ratio of 1:1 N,N'-diphenyl-N,N'-bis(3-methylphenyl)-1,1'-biphenyl-4,4'-diamine and MAKROLON®, a polycarbonate resin having a molecular weight of from about 50,000 to 100,000 commercially available from Farbenfabriken Bayer A.G. The resulting mixture was dissolved in methylene chloride to form a solution containing 15 percent by weight of solids. This solution was applied on the photogenerator layer using a Bird applicator to form a coating which upon drying had a thickness of 25 microns. During this coating process, the relative humidity was equal to or less than 15 percent. The resulting photoreceptor device containing all of the above layers was annealed at 135° C. in a forced air oven for 5 minutes and, thereafter, cooled to ambient room temperature.

EXAMPLE III

The process in Example I was repeated except the following charge generator was substituted. The adhesive interface layer was, thereafter, coated with a photogenerating layer (CGL) containing 80 percent by volume of benzimidazole perylene, and 20 percent by volume polyvinyl butyral. This photogenerating layer was prepared by introducing 0.12 gram of BMS polyvinyl butyral and 19 milliliters of n-butyl acetate into a 2 ounce amber bottle. To this solution was added 0.64 gram of benzimidazole perylene and 100 grams of ⅛ inch diameter stainless steel shot. This mixture was then placed on a ball mill for 96 hours. The resulting slurry was, thereafter, applied to the adhesive interface with a Bird applicator to form a layer having a wet thickness of 0.25 mil. The layer was dried at 135° C. for 5 minutes in a forced air oven to form a dry thickness photogenerating layer having a thickness of 0.4 micrometer.

EXAMPLE IV

The process in Example II was repeated except the following charge generator was substituted. The adhesive interface layer was, thereafter, coated with a photogenerating layer (CGL) containing 80 percent by volume of benzimidazole perylene, and 20 percent by volume of polystyrene/poly-4-vinyl pyridine. This photogenerating layer was prepared by introducing 0.12 gram of polystyrene/poly-4-vinyl pyridine and 19 milliliters of toluene into a 2 ounce amber bottle. To this solution was added 0.64 gram of benzimidazole perylene and 100 grams of ⅛ inch diameter stainless steel shot. This mixture was then placed on a ball mill for 96 hours. The resulting slurry was, thereafter, applied to the adhesive interface with a Bird applicator to form a layer having a wet thickness of 0.25 mil. The layer was dried at 135° C. for 5 minutes in a forced air oven to form a dry thickness photogenerating layer having a thickness of 0.4 micrometer.

EXAMPLES V throuqh VII

Photoreceptor devices were prepared as in Example I except the CGL was prepared by mixing the CGL dispersions made in Examples I and III using polyvinyl butyral binder in the following ratios: 25:75, 50:50, and 75:25 by weight of Example III:Example I.

| EXAMPLE NO. | TiOPc/BzP |
|---|---|
| V | 75:25 |
| VI | 50:50 |
| VII | 25:75 |

EXAMPLE VIII Through X

Photoreceptor devices were prepared as in Example I except the CGL was prepared by mixing the CGL dispersions made in Examples II and IV using polystyrene-co-4-vinyl pyridine in the following ratios: 25:75, 50:50, and 75:25 by weight of Example IV:Example II.

| EXAMPLE NO. | TiOPc/BzP |
|---|---|
| VIII | 75:25 |
| IX | 50:50 |
| X | 25:75 |

EXAMPLE XI

The xerographic electrical properties of the imaging members were determined by electrostatically charging the surfaces thereof with a corona discharge source to a surface charge density of $1.2\times10^{-7}$ coulombs/cm$^2$ as measured by a capacitively coupled probe attached to an electrometer. The dark development potential, $V_{ddp}$, was measured 0.66 second after charge using an electrostatic voltmeter with the samples kept in the dark. The sample was then exposed to a xenon arc lamp to discharge the member to residual surface potential of approximately 20 volts. After 10,000 charge/erase cycles, the $V_{ddp}$ was again measured. The cyclic stability was determined by the reduction in $V_{ddp}$ value after cycling. The percent of cycledown was calculated as $100\times(V_{ddp}\text{ initial}-V_{ddp\ 10,000})/V_{ddp\ initial}$.

Photosensitivity was measured by electrostatically charging the surfaces thereof with a corona discharge source to a surface potential of −800 volts 0.66 second after charging. At 0.15 second after charging, the photoreceptor is exposed to filtered light of 670 nanometers and 780 nanometers wavelength from a Xenon lamp with an exposure energy of 3.8 ergs/cm$^2$. The sensitivity is determined by the reduction of surface potential from $V_{ddp}$ to a background potential $V_{bg}$ due to the photodischarge effect observed. The percent of photodischarge was calculated as $100\times(V_{ddp}-V_{bg})/V_{ddp}$.

Cyclic stability and photosensitivity were determined as follows with reference to the working Examples and the comparative data thereof.

| EXAMPLE | TiOPc/ BzP Ratio | % Cycle-down | Photo-sensitivity 670 nm % Discharge 3.8 ergs/cm$^2$ | Photo-sensitivity 780 nm % Discharge 3.8 ergs/cm$^2$ |
|---|---|---|---|---|
| Control Example I | 100/0 | 14.6 | 90.8 | 96.3 |
| Invention Example V | 75/25 | 10.2 | 86.9 | 94.8 |
| Invention | 50/50 | 6.5 | 73.9 | 84.3 |

-continued

| EXAMPLE | TiOPc/ BzP Ratio | % Cycle-down | Photo-sensitivity 670 nm % Discharge 3.8 ergs/cm$^2$ | Photo-sensitivity 780 nm % Discharge 3.8 ergs/cm$^2$ |
|---|---|---|---|---|
| Example VI Invention | 25/75 | 2.5 | 74.6 | 65.0 |
| Example VII Control | 0/100 | 2.6 | 66.5 | 5.0 |
| Example III Control | 100/0 | 14.6 | 97.4 | 98.4 |
| Example II Invention | 75/25 | 5.1 | 97.8 | 97.9 |
| Example VIII Invention | 50/50 | 2.7 | 90.7 | 95.5 |
| Example IX Invention | 25/75 | 1.1 | 74.3 | 86.8 |
| Example X Control | 0/100 | 3.0 | 50.6 | 5.5 |
| Example IV | | | | |

Other modifications of the present invention may occur to those skilled in the art subsequent to a review of the present application, and these modifications, including equivalents thereof, are intended to be included within the scope of the present invention.

What is claimed is:

1. A process for increasing the imaging cyclic stability of titanyl phthalocyanines by adding to said titanyl phthalocyanines a perylene.

2. A process in accordance with claim 1 wherein the perylene is benzimidazole perylene.

3. A process in accordance with claim 1 wherein the perylene is comprised of a mixture of the cis and trans isomers of benzimidazole perylene.

4. A process in accordance with claim 3 wherein the perylene is bisbenzimidazo[2,1-a:2′,1′-a′]anthra[2,1,9-def:6,5,10-d′e′f′]diisoquinoline-10,21-dione and bisbenzimidazo[2,1-a: 1′,2′-b′]anthra[2,1,9-def:6,5,10-d′e′f′-]diisoquinoline-6,11-dione trans and cis isomers, respectively.

5. A process in accordance with claim 1 wherein the titanyl phthalocyanine is Type IV titanyl phthalocyanine.

6. A process in accordance with claim 5 wherein from about 50 to about 75 weight percent of the perylene, and from about 50 to about 25 weight percent of the phthalocyanine are selected.

7. A process in accordance with claim 5 wherein about 50 percent of the perylene and about 50 weight percent of the phthalocyanine are selected.

8. A process in accordance with claim 1 wherein said phthalocyanines and perylene are dispersed separately in polyvinyl butyral/n-butyl acetate solution, or a polystyrene-co-4-vinyl pyridine/toluene solution, followed by mixing and milling.

9. A process in accordance wth claim 3 wherein the trans isomer is present in an amount of about 50 percent, and the cis isomer is present in an amount of about 50 percent.

10. A process in accordance with claim 1 wherein from about 50 to about 75 weight percent of perylene and from about 50 to about 25 weight percent of titanyl phthalocyanine are selected.

* * * * *